United States Patent
Osuala et al.

(10) Patent No.: US 11,669,686 B2
(45) Date of Patent: Jun. 6, 2023

(54) SEMANTIC TEXT COMPARISON USING ARTIFICIAL INTELLIGENCE IDENTIFIED SOURCE DOCUMENT TOPICS

(71) Applicant: International Business Machines Corporation, Armonk, NY (US)

(72) Inventors: Richard Obinna Osuala, Munich (DE); Christopher M. Lohse, Stuttgart (DE); Ben J. Schaper, Stuttgart (DE); Marcell Streile, Knetzgau (DE); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 17/303,098

(22) Filed: May 20, 2021

(65) Prior Publication Data
US 2022/0374598 A1 Nov. 24, 2022

(51) Int. Cl.
*G06F 40/279* (2020.01)
*G06N 3/08* (2023.01)

(52) U.S. Cl.
CPC ............. *G06F 40/279* (2020.01); *G06N 3/08* (2013.01)

(58) Field of Classification Search
CPC .... G06F 40/279; G06F 40/216; G06F 40/284; G06F 40/30; G06N 3/08
USPC .......................................................... 704/9
See application file for complete search history.

(56) References Cited

U.S. PATENT DOCUMENTS

| 7,711,668 | B2 | 5/2010 | Brinker |
| 9,141,882 | B1 | 9/2015 | Cao |
| 2019/0325066 | A1 | 10/2019 | Krishna |
| 2020/0285804 | A1 | 9/2020 | Rubin |
| 2020/0320370 | A1 | 10/2020 | Khatri |

OTHER PUBLICATIONS

Alguliyev, et al., "COSUM: Text summarization based on clustering and optimization", Expert Systems, vol. 36, Issue 1, Feb. 2019, Abstract Only, 2 pages, <https://onlinelibrary.wiley.com/doi/101111/exsy.12340>.

(Continued)

*Primary Examiner* — Thierry L Pham
(74) *Attorney, Agent, or Firm* — Michael A. Petrocelli

(57) ABSTRACT

A computer assigns a similarity value to a comparison document. The computer receives, reference document contextual word embeddings arranged into first set of topic clusters, each with a representative embedding. The computer receives comparison document contextual word embeddings. The computer determines, using a trained neural network model classifier, for each comparison document contextual word embedding, topic correspondence values relative to the representative embeddings of said first set of clusters. The computer generates a second set of clusters by assigning comparison document embeddings to best matching one of the first clusters, according to the topic correspondence values. The computer determines a second set of representative embeddings and uses a comparison method, to determine a cluster similarity value for second set clusters compared to first set representative embeddings. The computer determines document similarity values based, at least in part, on at least one of cluster similarity values.

20 Claims, 16 Drawing Sheets

(56) References Cited

OTHER PUBLICATIONS

Babic, et al., "Short texts semantic similarity based on word embeddings", Proceedings of the Central European Conference on Information and Intelligent Systems, 2019, pp. 27-33, <archive.ceciis.foi.hr/app/public/conferences/2019/Proceedings/DKB/DKB1.pdf>.

Cha, et al., "Language Modeling by Clustering with Word Embeddings for Text Readability Assessment", CIKM '17, 4 pages, <www.eecs.harvard.edu/~htk/publication/2017-cikm-cha-gwon-kung.pdf>.

Conneau, et al., "Supervised Learning of Universal Sentence Representations from Natural Language Inference Data", Proceedings of the 2017 Conference on Empirical Methods in Natural Language Processing, pp. 670-680, <https://www.aclweb.org/anthology/D17-1070.pdf>.

Dai, et al., "From Social Media to Public Health Surveillance: Word Embedding based Clustering Method for Twitter Classification", SoutheastCon 2017, 7 pages, <https://ieeexplore.ieee.org/document/7925400>.

Devlin, et al., "BERT: Pre-training of Deep Bidirectional Transformers for Language Understanding", arXiv:1810.04805v2, May 24, 2019, 16 pages, <https://export.arxiv.org/abs/1810.04805>.

Gao, et al., "SUPERT: Towards New Frontiers in Unsupervised Evaluation Metrics for Multi-Document Summarization", arXiv:2005.03724v1, May 7, 2020, 8 pages, <https://arxiv.org/abs/2005.03724>.

Hailu, et al., "A Framework for Word Embedding Based Automatic Text Summarization and Evaluation", Information 2020, vol. 11, 78, 23 pages, <https://www.mdpi.com/2078-2489/11/2/78>.

Jia, et al., "Matching Questions and Answers in Dialogues from Online Forums", arXiv:2005.09276v2, Aug. 3, 2020, 8 pages, <https://arxiv.org/pdf/2005.09276.pdf>.

Mell, et al., "The NIST Definition of Cloud Computing", National Institute of Standards and Technology, Special Publication 800-145, Sep. 2011, 7 pages.

Pan, et al, "Deep neural network-based classification model for Sentiment Analysis", arXiv:1907.02046v1, Submitted on Jul. 3, 2019], 6 pages, <https://arxiv.org/abs/1907.02046>.

Radev, et al., "Centroid-based summarization of multiple documents: sentence extraction, utility-based evaluation, and user studies", Proceedings of the 2000 NAACL-ANLPWorkshop on Automatic Aummarization, vol. 4, Apr. 2000, pp. 31-30, <https://www.aclweb.org/anthology/W00-0403v2.pdf>.

Raiol De Miranda, et al., "Detecting Topics in Documents by Clustering Word Vectors", DCAI 2019: Distributed Computing and Artificial Intelligence, 16th International Conference, pp. 235-243, <https://www.researchgate.net/publication/333950113_Detecting_Topics_in_Documents_by_Clustering_Word_Vectors>.

Ramon-Hernandez, et al., "Towards Context-Aware Opinion Summarization for Monitoring Social Impact of News", Information 2020, 11, 535, 21 pages.

Rossiello, et al., "Centroid-based Text Summarization through Compositionality of Word Embeddings", Proceedings of the MultiLing 2017 Workshop on Summarization and Summary Evaluation Across Source Types and Genres, pp. 12-21, <https://www.aclweb.org/anthology/W17-1003.pdf>.

Sapkota, et al., "Data Summarization Using Clustering and Classification: Spectral Clustering Combined with k-Means Using NFPH", 2019 International Conference on Machine Learning, Big Data, Cloud and Parallel Computing (Com-IT-Con), pp. 146-151, <https://ieeexplore.ieee.org/stamp/stamp.jsp?tp=&arnumber=8862218>.

Shen, et al., "Word Embedding Based Correlation Model for Question/Answer Matching", arXiv:1511.04646v2, Nov. 26, 2016, 7 pages, <https://arxiv.org/abs/1511.04646>.

Sun, et al., "The Feasibility of Embedding Based Automatic Evaluation for Single Document Summarization", Proceedings of the 2019 Conference on Empirical Methods in Natural Language Processing and the 9th International Joint Conference on Natural Language Processing, pp. 1216-1221, <https://www.aclweb.org/anthology/D19-1116/>.

Vandermaaten, et al., "Visualizing Data using t-SNE", Journal of Machine Learning Research, vol. 9, 2008, pp. 2579-2605, <https://www.jmlr.org/papers/v9/vandermaaten08a.html>.

Wang, et al., "Improving Neural-Network Classifiers Using Nearest Neighbor Partitioning", IEEE Transactions on Neural Networks and Learning Systems, vol. 28, No. 10, Oct. 2017, pp. 2255-2267, <https://eeexplore.ieee.org/document/7502076>.

Wang, et al., "Semantic expansion using word embedding clustering and convolutional neural network for improving short text classification", Neurocomputing vol. 174, Part B, Jan. 22, 2016, pp. 806-814, <https://www.sciencedirect.com/science/article/abs/pii/S0925231215014502?via%3Dihub>.

Wrzalik, et al., "Balanced Word Clusters for Interpretable Document Representation", 2019 International Conference on Document Analysis and Recognition Workshops (ICDARW), pp. 103-109, <https://ieeexplore.ieee.org/document/8892983>.

Wu, et al., "Exploration of text matching methods in Chinese disease Q&A systems: A method using ensemble based on BERT and boosted tree models", Journal of Biomedical Informatics, vol. 115, Mar. 2021, 5 pages, <https://www.sciencedirect.com/science/article/abs/pii/S1532046421000125>.

Xenouleas, et al., "SUM-QE: a BERT-based Summary Quality Estimation Model", arXiv:1909.00578v1, Sep. 2, 2019, 7 pages, <https://arxiv.org/pdf/1909.00578.pdf>.

Xiong, et al., "IARNN-Based Semantic-Containing Double-Level Embedding Bi-LSTM for Question-and-Answer Matching", Computational Intelligence and Neuroscience, vol. 2019, Article ID 6074840, 10 pages, <https://www.hindawi.com/journals/cin/2019/6074840/>.

504 → Cluster $C_{A1}$ is selected for embedding $E_{B1}$ if $y_{EB1\_CA1}$ is greater than all other predicted y between embedding $E_{B1}$ and cluster centers $C_A$ b1

Total number of embeddings of A = 26
Number of clustered embedding of A: $n_A$ = 24 ← 902
Number of cluster members a1: $n_{a1}$ = 13
Number of cluster members a2: $n_{a2}$ = 11

Total number of embeddings of B = 14
Number of clustered embedding of B: $n_B$ = 11
Number of cluster members b1: $n_{b1}$ = 6
Number of cluster members b2: $n_{b2}$ = 5    ← 1002

Calculated correspondences d1, d2 computed by neural network (nn) between centroids of corresponding clusters of B and A (closer distances represent stronger correlations):
d1 = nn(a1, b1) = 0.8
d2 = nn(a2, b2) = 0.9

← *1102*

Cluster weight of a1: $w_{a1} = n_{a1}/n_A = 13/24 = 0.542$
Cluster weight of a2: $w_{a2} = n_{a2}/n_A = 11/24 = 0.458$
Cluster weight of b1: $w_{b1} = n_{b1}/n_B = 6/11 = 0.545$
Cluster weight of b2: $w_{b2} = n_{b2}/n_B = 5/11 = 0.455$ Relative weight proportion b1 to a1: $p_{b1a1} =$
$Min(w_{a1}, w_{b1})/Max(w_{a1}, w_{b1}) = 0.542/0.545 = 0.994$
Relative weight proportion b2 to a2: $p_{b2a2} =$
$Min(w_{a2}, w_{b2})/Max(w_{a2}, w_{b2}) = 0.455/0.458 = 0.993$ Summary score of B for cluster a1: $s_{a1} =$
$\mathbf{d1 * w_{a1} * p_{b1a1}} = 0.8 * 0.542 * 0.994 = 0.431$ Summary score of B for cluster a2: $s_{a1} =$
$\mathbf{d2 * w_{a2} * p_{b2a2}} = 0.9 * 0.458 * 0.993 = 0.409$ Weighted Summary score of $B_A$: sufficiency rating =
$\mathbf{(s_{a1} + s_{a2})} = (0.431 + 0.409) = \mathbf{0.84}$ Quality gate threshold for summary $\mathbf{T_S = 0.6}$ Summary is accepted, as $S_{BA} > T_S$

SEMANTIC TEXT COMPARISON USING ARTIFICIAL INTELLIGENCE IDENTIFIED SOURCE DOCUMENT TOPICS

BACKGROUND

The present invention relates generally to the field of natural language processing, and more specifically, to a method of assessing the similarity of one or more comparison documents to one or more reference documents.

Computer systems that use Natural Language Processing (NLP) and similar Artificial Intelligence (AI) methods can produce summaries of various documents. Synthetic text summaries are a highly useful tool for companies and organizations in many different scenarios and use—cases (e.g., including providing overviews of document content, transferring knowledge, answering questions, etc.).

Many of these methods (e.g., Language Models, Autoencoders, Generative Adversarial Networks, and so forth) rely on unsupervised leaning methods and produce results that vary widely in terms of quality and content. Unfortunately, many document restatement methods (e.g., methods that provide document summaries, translations, etc.) generate output that is inaccurate, incomplete, in need of revision or is otherwise unacceptable.

SUMMARY

In embodiments according to the present invention, a computer implemented method to assign a similarity value to a comparison document include receiving by the computer, for a reference document, contextual word embeddings arranged into a first set of clusters, each representing a topic and characterized by a representative embedding. The computer receives for at least one comparison document, a set of contextual word embeddings. The computer determines, using a neural network model classifier trained to predict whether embeddings are in a same cluster, for each comparison document contextual word embedding, topic correspondence values relative to the representative embeddings of the first set of clusters. The computer generates, a second set of clusters by assigning each comparison document contextual word embedding to a best matching one of the first set of clusters, according to the topic correspondence values. The computer determines a representative embedding for each of the second set of clusters. The computer uses a comparison method to determine for each centroid of the second set of clusters compared to each centroid of the first set of clusters, a cluster similarity value. The computer determines for each comparison document, a document similarity value based, at least in part, on at least one of the cluster similarity values. According to aspects of the invention, the document similarity value rating is further based upon multiplying said cluster similarity values by at least one modification value selected from a group consisting of an associated cluster weight value, and a cluster relative weight proportion. According to aspects of the invention, a set of training data for the neural network includes pairs of intra-cluster and inter-cluster embeddings from a set of the clusters respectively, wherein each pair is labeled as intra-cluster or inter-cluster, and the computer neural network generates a classifier based on the training data. According to aspects of the invention, the received contextual word embeddings are generated by passing text from the reference document through a deep neural network. According to aspects of the invention, the clusters are established by applying a clustering algorithm to said embeddings. According to aspects of the invention, the representative embeddings are based, at least in part, on a computed embedding value selected from a group consisting of mean embedding, medoid embedding, and concatenated embedding of a plurality of embeddings in the cluster. According to aspects of the invention, in response to a sufficiency rating exceeding a sufficiency threshold, determining the comparison document to be an acceptable representation of the reference document. According to aspects of the invention, the at least one comparison document is a group of comparison documents; wherein the computer generates a document similarity value for each of the of comparison documents, and the computer generates a ranked list of the comparison documents ordered, at least in part by document similarity value.

In another embodiment of the invention, a system to assign a similarity value to a comparison document includes a computer system comprising a computer readable storage medium having program instructions embodied therewith, the program instructions executable by a computer to cause the computer to receive for a reference document, contextual word embeddings arranged into a first set of clusters, each representing a topic and characterized by a representative embedding; receive for at least one comparison document, a set of contextual word embeddings; determine using a neural network model classifier trained to predict whether embeddings are in a same cluster, for each comparison document contextual word embedding, topic correspondence values relative to the representative embeddings of said first set of clusters; generate a second set of clusters by assigning each comparison document contextual word embedding to a best matching one of the first set of clusters, according to the topic correspondence values; determine a representative embedding for each of the second set of clusters; use a comparison method, to determine for each centroid of the second set of clusters compared to each centroid of the first set of clusters, a cluster similarity value; and determine for each comparison document, a document similarity value based, at least in part, on at least one of the cluster similarity values.

In another embodiment of the invention, a computer program product to assign a similarity value to a comparison document, the computer program product comprising a computer readable storage medium having program instructions embodied therewith, the program instructions executable by a computer to cause the computer to: receive, using the computer, for a reference document, contextual word embeddings arranged into a first set of clusters, each representing a topic and characterized by a representative embedding; receive, using the computer, for at least one comparison document, a set of contextual word embeddings; determine, using the computer, using a neural network model classifier trained to predict whether embeddings are in a same cluster, for each comparison document contextual word embedding, topic correspondence values relative to the representative embeddings of said first set of clusters; generate, using the computer, a second set of clusters by assigning each comparison document contextual word embedding to a best matching one of the first set of clusters, according to the topic correspondence values; determine, using the computer, a representative embedding for each of the second set of clusters; use a comparison method to determine for each centroid of the second set of clusters compared to each centroid of the first set of clusters, a cluster similarity value; determine, using the computer, for each comparison document, a document similarity value based, at least in part, on at least one of the cluster similarity values.

The present disclosure recognizes and addresses the shortcomings and problems associated with accurately summarizing, translating, and otherwise comparing groups of documents. It is noted that the term computer as used herein may include standalone computing units, devices that are part of a computing system, and elements thereof, selected as appropriate by one of skill in this field.

Considering a reference document, A as a list of words $w_A$, each word w in $w_A$ is semantically related to other words in $w_A$. Some words are more strongly related to each other than others (e.g., words in the same sentence may have a stronger semantic connection than words form different sentences). Taken together, the words with strong semantic relation form "units of meaning" (e.g., this could be a sentence). If one takes all such "units of meaning" from a text and compares the associated semantics, some are more related to each other while others are less related to each other. Grouping the more related ones together, one can separate text into "semantic topics". If an ideal comparison document B would comprise the same semantic content as A, then such a B would also consist of the same "semantic topics" as A. It is noted, that even though the semantic topics of A and B would be similar, their "units of meaning" could be quite different without affecting the similarity of their semantic topics (e.g., as in the case of the same story told by two different people). Aspects of the present invention recognize this relationship and evaluate comparison documents B considering presence of semantic topics in B that correspond to semantic topics present in A.

Aspects of the invention improving comparison accuracy, while increasing computational efficiency. For example, in an embodiment, the method clusters document text content into different semantic groups (e.g., topics) which are then represented by centroids of clusters. The comparison document clusters are derived from (e.g., are dependent on) clusters in the reference document text. Aspects of the invention reduce computing requirements through use of a pretrained encoder, while maintaining or improving overall cluster comparison accuracy.

Aspects of the invention improve accuracy through text comparison based on centroid distance weighted by a cluster's number of embeddings and weight proportions between matching clusters in the comparison text and reference text.

Aspects of the invention use contextual word embeddings (e.g., as generated via a Neural Network based Encoder), thereby considering aspects of neighboring words when creating embeddings.

Aspects of the invention use contextual word embeddings to automatically generate semantic clusters and compare the distances of representative embeddings (i.e., representations of semantic topics) and apply additional modification values (e.g., parameters that indicate how individual topic are treated in a given document) including a relative weight proportion and cluster weights based on the amount of words in the respective cluster in the comparison and reference texts. In an embodiment, the present method compares text content by considering centroid distances weighted by a cluster's number of embeddings and weight proportions between matching clusters of reference text and original text, thereby comparing text on word context level, evaluating the documents based on word context embedding cluster distances.

Aspects of the invention use contextual word embeddings generated via an encoder neural network with sliding context windows. Embodiments of the current method compute the similarity of n:m texts (e.g., comparing one or more comparison documents compared with one or more reference documents) and automatically identifies topics or labels associated with each of the documents.

Embodiments of the present method use a Neural Network (NN) classifier trained with reference-document-text-related training data to identify reference text clusters (embeddings input and labels) in a reference text.

Aspects of the invention identify the semantic topics of text based on context-aware word-embeddings generated by passing a context window of words through a neural network encoder.

Aspects of the invention indicate correspondence between a semantic topic identified in a reference text and a second semantic topic from a comparison text (i.e. the summary (or other preferred representation) of the reference text) via NN based comparisons between centroids of context-aware word-embedding clusters.

Aspects of the invention calculate a semantic topic correspondence metric between corresponding semantic topics of the reference text and the comparison text using a 3-fold approach that considers various aspects of overall topic treatment within the compared document texts. Embodiments of the method consider each vector distance between the corresponding representative embeddings (semantic topics) of reference text and comparison text, weight each distance based on the relative number of embeddings in the corresponding cluster of the reference text, and weight each distance based on the relative weight proportion between the corresponding cluster of the reference text and the corresponding cluster of the comparison text.

Aspects of the invention use a clustering algorithm as input for a neutral network classifier that, in turn, calculates the clusters for one or more (e.g., a quantity identified herein as "m") comparison text documents, with respect to one or more (e.g., a quantity identified herein as "n") reference text documents.

Aspects of the present invention improve interpretability. The present method provides scores for a comparison text given a reference text that are interpretable (e.g., the results can be explained to the user). Calculations of comparing clusters/topics and results thereof can be visualized and traced back to their origin. For example, the clusters can be shown as t-distributed stochastic neighbor embedding (t-SNE) graph or table to the user. A user can visually inspect which clusters were matched and which correspondence score was obtained. Features of the present method enable the use case data exploration, where a user can analyze texts of interest to learn which topics are well or under-represented and how this compares to other texts from the same domain/category.

Aspects of the present invention provide analytic calculations in an evaluation module. It is noted that while neural networks are good at learning complex functions, they are not readily usable for computing pre-defined calculations. The latter is a benefit in our evaluation module (e.g., to evaluate two texts based on cluster weights and relative cluster weight proportions).

Aspects of the present invention recognize and address the importance of semantic topics when comparing text documents. In particular, the present method indicates that two texts are good semantic representations of each other, if they cover the same semantic topics with the same fraction of words. This identification is particularly beneficial for summary (or other preferred representation) evaluation, as well as for semantic text comparison. It is noted that effective text comparison detects, as a preliminary matter, semantic topics (e.g., as represented by embedding clusters of a reference text), and that those topics provide a basis on which a comparison text can be evaluated. It is noted that a sequential process of encoding, clustering of reference text, and cluster comparison of comparison text, is accommodated by the present method multi-phase, cooperative neural network operation.

Aspects of the invention provide granular text content comparison. In particular, aspects of the present method provide single word level comparison, which provides increased accuracy and interpretability (for example, in cases where two texts have one dominant overlapping topic, while having other topics that do not overlap).

Aspects of the present invention penalize a computed baseline comparison text score when reference document topics are missing in (or are underrepresented by) a comparison document.

Aspects of the beneficially reduce computational resources by streamlining computation with a pre-trained encoder model that fine-tunes a compact neural network on binary intra- and inter-topic embedding pair classification.

Aspects of the invention include an encoder neural network fine-tuned to improve embedding generation. According to aspects of the invention, the pretrained encoder model can encode some given text into embeddings, and these embeddings are used as additional training data to "fine-tune" a comparison module classifier. In an embodiment, an encoder model is fine-tuned on intra- and inter cluster embedding pair classification. In an embodiment, an encoder model is fine-tuned with additional reference document text.

It is noted that aspects of the present invention could help match provided answers to related questions (e.g., such as in the process also known as "Q&A"). For example, aspects of the method could generate a Q&A dataset by encoding entire questions (i.e. sentence embedding) and clustering the embedded questions. With the information of the clusters, the method would identify which questions pertain to identified topics. The method would have access to questions that match topics and could generate a topic cluster by inserting contextual word embeddings from question-answer pairs into corresponding clusters. The method would draw inter- and intra-topic embedding pairs from the topic clusters to train the NN classifier. This way, the classifier would learn the semantic distinction between distributions from question-answer pairs from non-corresponding topics. Aspects of the comparison module could, for question and answer analysis tasks, (e.g., especially as used in a chat dialogue), define a single topic for the contextual word embeddings of the question. In this way, for a comparison text (i.e., a prospective answer to the question), the comparison module would use the NN classifier and thresholding to determine which of the contextual word embeddings of the comparison text belong to the question topic. A comparison score would be computed using the NN classifier with the centroid of the question topic cluster and the centroid of the comparison text cluster, based on word embeddings belonging to the question topic. Aspects of the evaluation module could be adjusted for Q&A. For example, given the above-described adjustment in the comparison module, the evaluation module can weight and penalize based on the fraction of word embeddings from the comparison text that belong to the question topic. While the comparison score tells us how well the relevant part of the answer overlaps with the question, the fraction tells us how well the entire answer focuses on the question. Based on this, and given a question, the evaluation module would identify and rank a plurality of prospective answer texts.

Aspects of the present method (e.g., a comparison module) learn a reference text-specific function of semantic similarity between cluster distributions using an artificial neural network. In particular, the method provides automated dataset generation of intra- and inter-cluster word embedding pairs. The method also trains/fine-tunes a Neural Network (NN) on the generated dataset using a loss function (e.g., binary cross entropy or other loss functions selected by one skilled in this field). The method compares word embeddings from comparison texts with representative embeddings from reference texts via the NN. The method provides reference text dependent clustering of comparison text by assignment of comparison text word embeddings to clusters of reference text via the NN classifier. The method also determines semantic topic similarity via centroid comparison between corresponding clusters from inference and reference texts via the NN classifier.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 12 is an overview of exemplary calculations made by the evaluation module of the system shown in FIG. 1.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
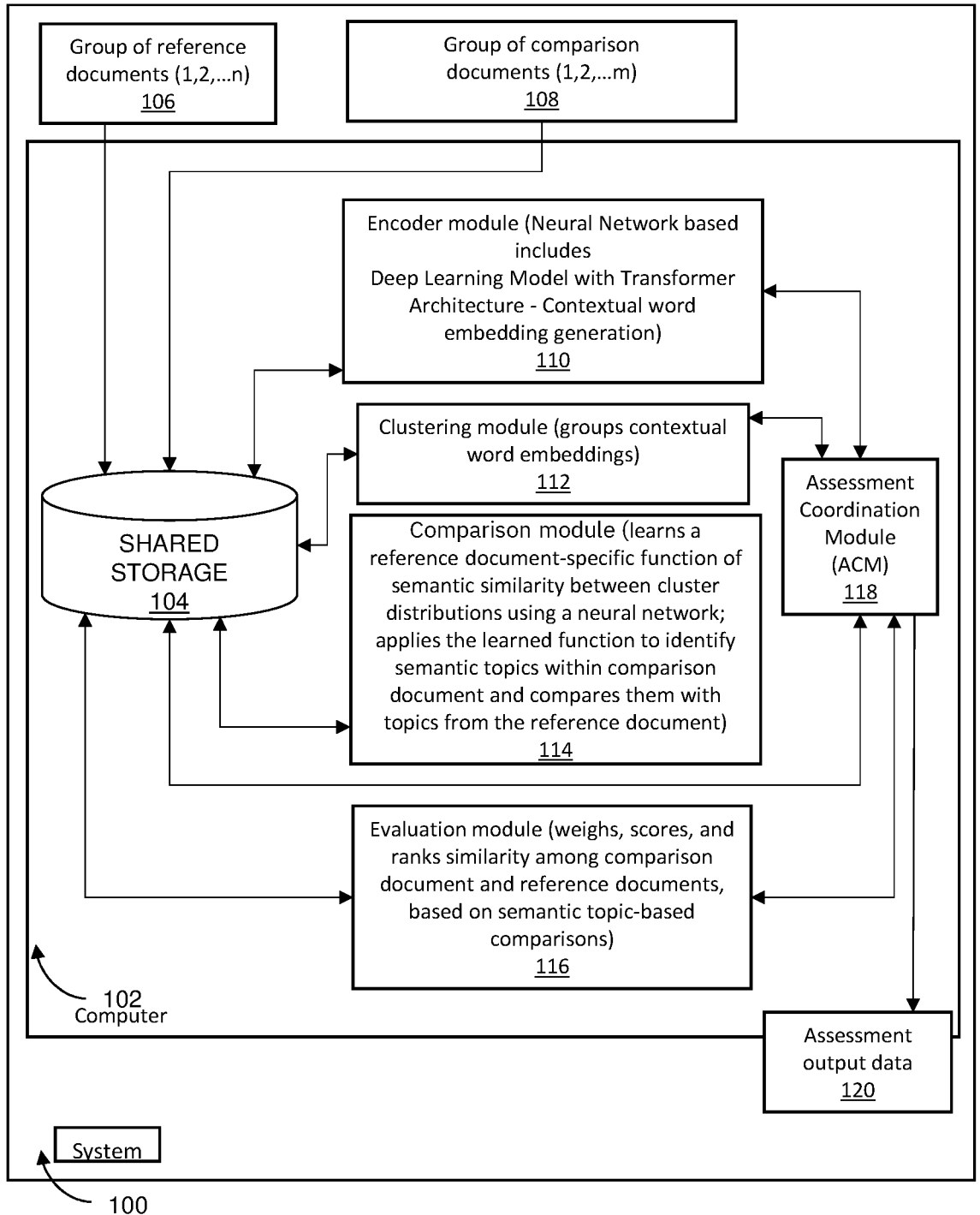
FIG. 1 is a schematic block diagram illustrating an overview of a system for a method to assess the similarity of one or more comparison documents to one or more reference documents using contextual embeddings derived from the documents and clusters associated with topics present in the reference documents according to embodiments of the present invention.
Figure 2:
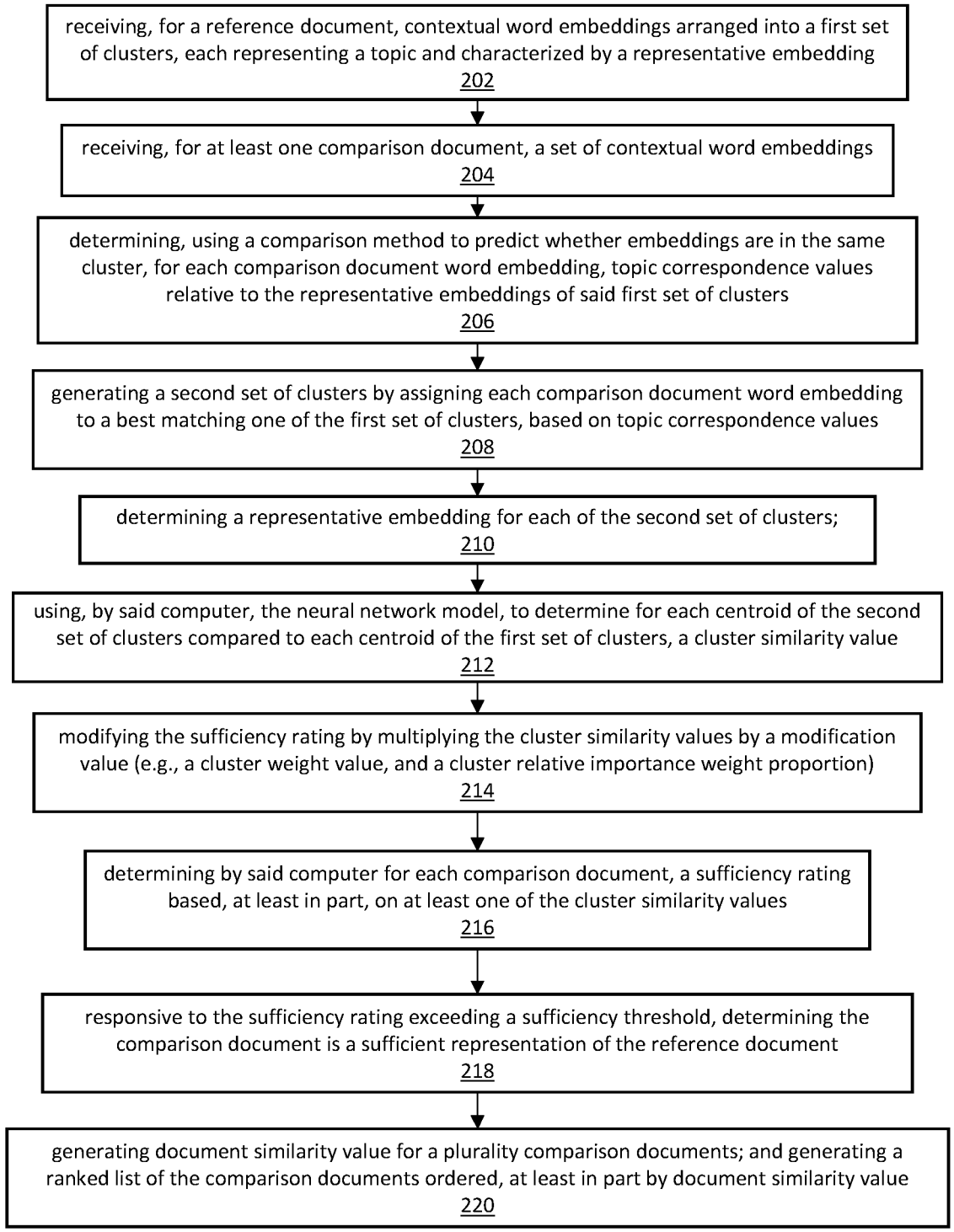
FIG. 2 is a is a flowchart illustrating a method, implemented using the system shown in FIG. 1, of assessing the similarity of one or more comparison documents to one or more reference documents using contextual embeddings derived from the documents and clusters associated with topics present in the reference documents according to embodiments of the present invention according to aspects of the invention.

Now with combined reference to the Figures generally and with particular reference to FIG. 1 and FIG. 2, an overview of a method to assess the similarity of one or more comparison documents (a quantity of n) to one or more reference documents (a quantity of m) using contextual embeddings derived from the documents and clusters associated with topics present in the reference documents within a system 100 as carried out by a server computer 102 having optionally shared storage 104 is provided. The server computer 102 receives a group of reference documents 106 and comparison documents 108 from sources available to the server computer. It is noted that as used herein, the term "document" means any of a variety of sources of text, including physical documents, electronic or digital documents, audio recordings that can be converted into text and so forth, in their entirety, as well as selected portions thereof.

The server computer 102 includes an encoder module (e.g., a neural network based model) 110 that incorporates a Deep Learning Model (DLM) based on Transformer Architecture (e.g., the model known as BERT and the like) and generates contextual word embeddings from the reference and comparison documents 106, 108. The server compute 102 includes a clustering module 112 that groups contextual word embeddings generated by the encoder module 110.

The server computer 102 includes comparison module 114 that learns a reference document-specific function of semantic similarity between cluster distributions using a neural network. The comparison module 114 applies this learned function to identify semantic topics within comparison documents 108 and compare them with topics from the reference documents 106. The server computer 102 includes evaluation module 116 that weighs, scores, and ranks similarity among comparison document and reference documents, based on semantic topic-based comparisons.

The server computer 102 includes Assessment Coordination Module (ACM) 118 that passes information among the various modules and allows for iterative analysis of various combinations of multiple reference documents 106 with multiple comparison documents 108. The ACM ensures that processing results are efficiently passed among the shared storage 104 and modules 110, 112, 114, & 116. When documents 106, 108 have been assessed, the ACM generates Assessment Output Data (AOD) 120, which can include a variety of information about the documents being compared. According to aspects of the invention, the AOD 120 may contain ranked lists of comparison documents, clusters, embeddings, cluster centroids, evaluation thresholds, hyperparameters, configurations, cluster weights, relative weight proportions, cluster scores, overall score of similarity score values for comparison documents compared to various reference documents, and other information generated as required by one skilled in this field.

Figure 6A:
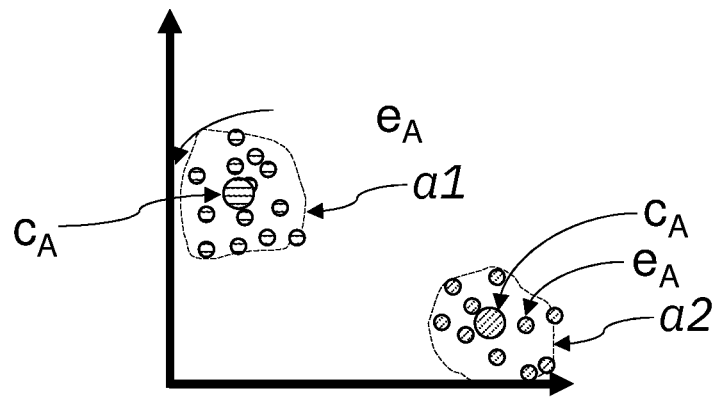
FIG. 6A is a schematic representation of aspects of establishing embedding clusters associated with a reference document according to aspects of the present invention.

Now with specific reference to FIG. 2, and to other figures generally, aspects of a method of assessing the similarity of one or more comparison documents 108 to one or more reference documents 106 using contextual embeddings derived from the documents and clusters associated with topics present in the reference documents according to aspects of the invention will be described. The server computer 102 receives, at block 202, for a reference document 106, contextual word embeddings $e_A$ arranged into a first set of clusters a1,a2 (for example, as shown in FIGS. 6A. 7A, and 8A), each corresponding to a semantic topic within the reference document and represented schematically in vector space by a representative embedding $c_A$ which, according to aspects of the invention, can be computed (e.g., the mean, median, or other value selected to provide a representative embedding) from embeddings in the corresponding cluster (i.e., $c_{a1}$ and $c_{a2}$ for a1 and a2, respectively). It is noted that while it is preferred to use a cluster centroid as a representative embedding, other representative embeddings (e.g. an existing embedding chosen by one skilled in this field to represent a notable aspect of the associated cluster, etc.) may also be used.

Figure 3:
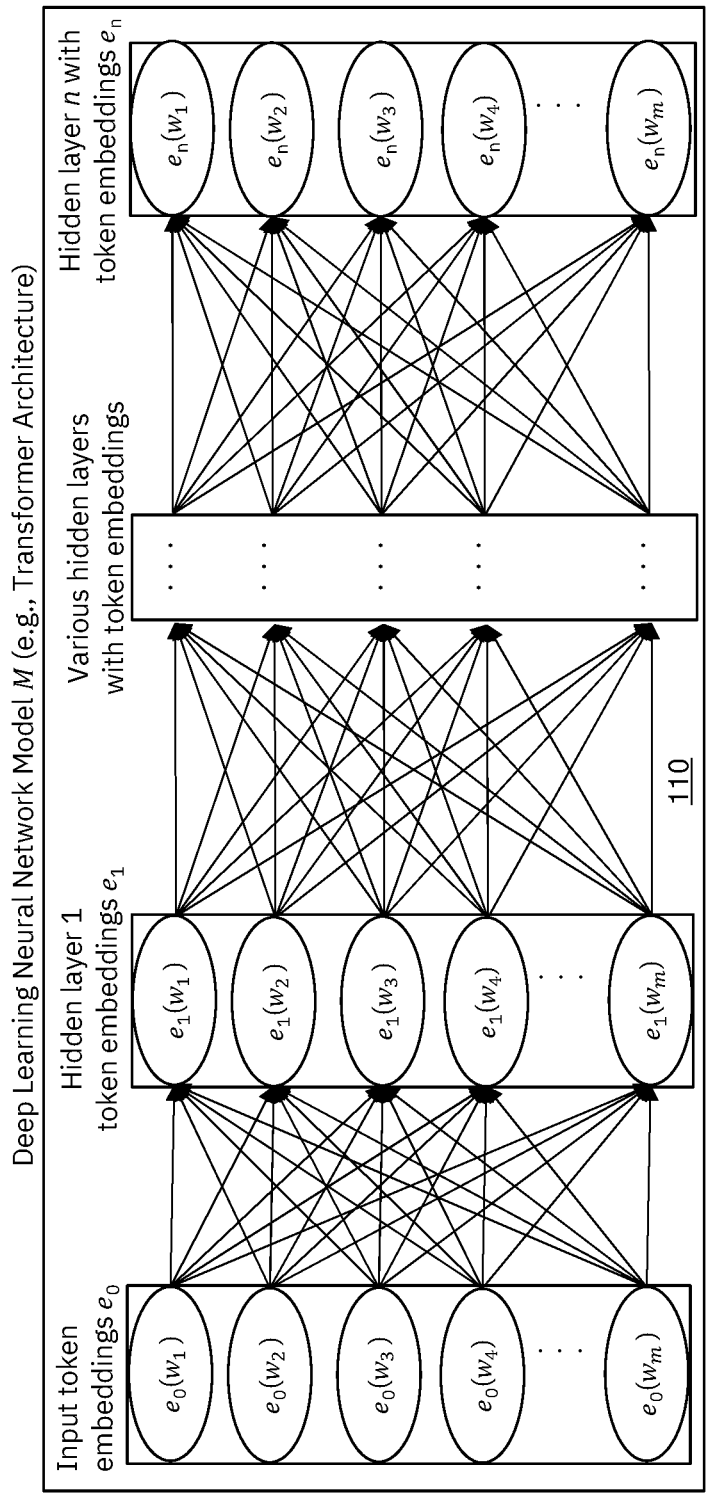
FIG. 3 is a schematic representation of aspects of an encoder module usable in the system shown in FIG. 1.

In an embodiment, the received embeddings $e_A$ are generated by encoder module 110 (as shown schematically in FIG. 3). According to aspects of the invention, the encoder module 110 generates contextual word embeddings for (masked) words in reference document text (or a plurality of texts A) 106 via sliding windows. In an embodiment, the encoder passes the reference text through a deep neural network (e.g., a transformer-based model such as that known in this field as "BERT" generated by Google LLC) to generate contextual word embeddings $e_A$, preferably using a sliding window approach. A contextual word embedding may be thought of as a hidden representation (e.g., a set of numeric vectors in the model's latent space) associated with a specific word wd from a list of words $wd_A$, considering the context of surrounding words. In an embodiment, the context can be $wd_A$. In another embodiment, $wd_A$ can be partitioned into various contexts. In an embodiment, commonplace "stop words" may be removed from the list of words $wd_A$ passed to the encoder 110. It is noted that stop words may be removed after the encoder has generated the embeddings, with the stop words assisting the encoder to better embed the semantic meaning of the other non-stop words/words of interest in $wd_A$. It is noted that although it is preferred to use a sliding window methodology, other methods (e.g., pass the entire text or parts of the text passages through the neural network encoder) as selected by one of skill in this field could also suffice.

Figure 7A:
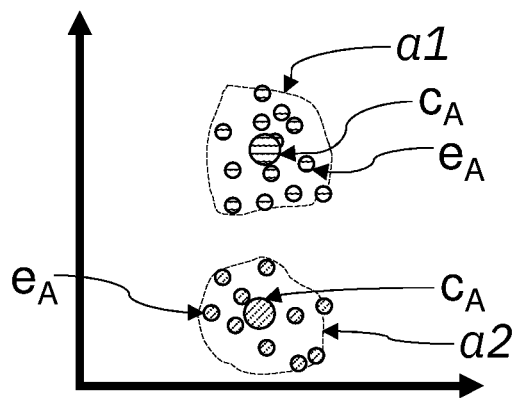
FIG. 7A is a schematic representation of aspects of establishing embedding clusters associated with a reference document according to aspects of the present invention.
Figure 8A:
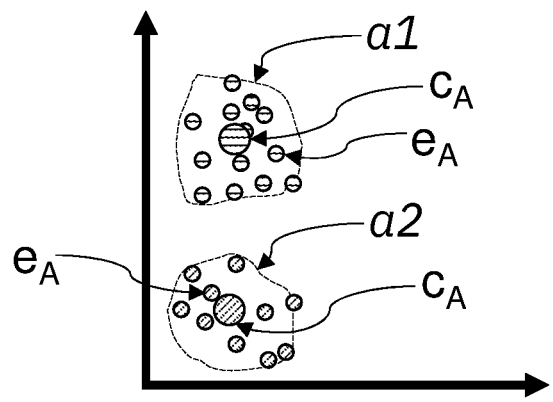
FIG. 8A is a schematic representation of aspects of establishing embedding clusters associated with a reference document according to aspects of the present invention.

According to aspects of the invention, the received cluster groupings a1,a2 are generated by the clustering module 112. In an embodiment, the clustering module applies a clustering algorithm (e.g., k-means algorithm or other suitable method selected by one skilled in this field, including k-medoids, hdbscan (density-based clustering), etc.) to compute cluster groups (e.g., as shown schematically in FIG. 6A, FIG. 7A, and FIG. 8A), of semantically similar embeddings. According to aspects of the invention, embedding clusters represent "semantic topics" for the reference documents 108. It is noted that while aspects of these diagrams are simplified as two-dimensional diagrams, embeddings may also be represented with higher-dimensional illustrations.

Figure 6B:
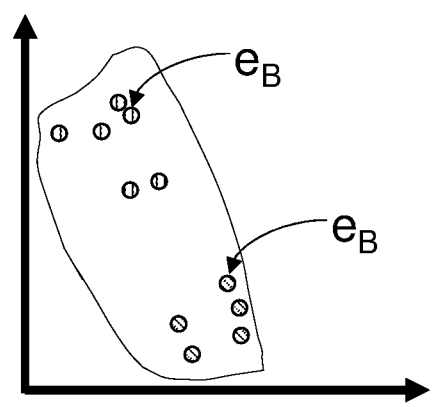
FIG. 6B is a schematic representation of aspects of establishing embedding clusters associated with a comparison document according to aspects of the present invention.
Figure 7B:
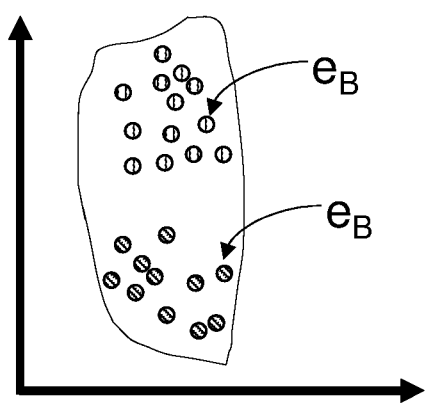
FIG. 7B is a schematic representation of aspects of establishing embedding clusters associated with a comparison document according to aspects of the present invention.
Figure 8B:
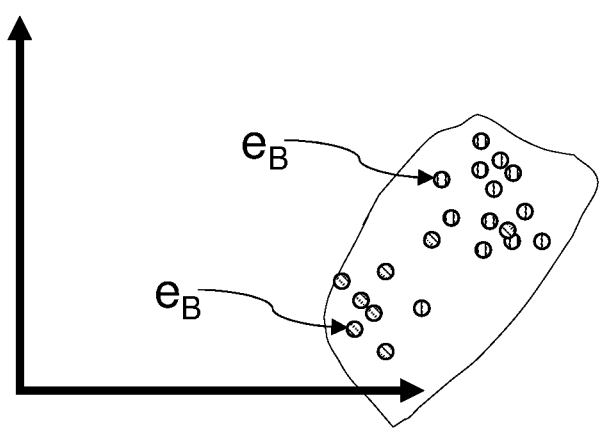
FIG. 8B is a schematic representation of aspects of establishing embedding clusters associated with a comparison document according to aspects of the present invention.

The server computer 102 receives, at block 204, contextual word embeddings $e_B$ for the one or more comparison documents 108. In an embodiment, the received embeddings $e_B$ (e.g., as shown schematically in FIG. 6B, FIG. 7B, and FIG. 8B), are generated by encoder module 110 (as shown schematically in FIG. 3). According to aspects of the invention, the encoder module 110 generates contextual word embeddings for (masked) words in comparison document text (or a plurality of texts) B 106 via sliding windows. In an embodiment, the encoder passes the reference text through a deep neural network (e.g., a transformer-based model such as that known in this field as "BERT" generated by Google LLC) to generate contextual word embeddings $e_B$, preferably using a sliding window approach. In an embodiment, commonplace "stop words" may be removed from the list of words $wd_B$ passed to the encoder 110. It is noted that although it is preferred to use a sliding window methodology, other methods (e.g., pass the entire text or parts of the text passages through the neural network encoder) as selected by one of skill in this field could also suffice.

When more than one reference document 106 or comparison document 108 is received, the server computer 102 directs control to the Assessment Coordination Module 118 to generate embeddings for each of the documents 106, 108. It is noted that, according to aspects of the invention, the contextual embeddings $e_A$, $e_B$ may be received directly from an embedding source (not shown) available to the server computer 102, instead of being generated by encoder module 110.

The server computer 102 determines, at block 206, using a neural network model classifier trained to predict whether embeddings are in the same cluster, for each comparison document word embedding, topic correspondence values relative to the representative embeddings (e.g., $c_{A1}$ and $c_{A2}$ for a1,a2 respectively). In particular, the comparison module 114 learns a reference document-specific function of semantic similarity between cluster distributions using a neural network. According to aspects of the invention, the server computer 102, applies the learned function to identify semantic topics within comparison documents 108 and compares them with topics a1,a2, from the reference documents 106. In an embodiment of the present invention, the server computer 102 trains (or fine tunes) a neural network classifier that predicts if an embedding pair is from the same cluster or if the two embeddings are from the same (or, based on probability predictions, different) clusters by, for example, considering loss (e.g., binary cross entropy). After training, the neural network classifier has learned a reference text-specific function that describes the semantic similarity between the cluster distributions of the compared texts. According to aspects of the invention, the classifier may be trained to learn a domain specific function instead of a reference text-specific function.

It is noted that a neural network is a preferred classifier model, especially since these models excel in online learning, continuing to learn after training from the clusters generated at inference time. However, other prediction models selected by one skilled in this field could also suffice. For example, according to aspects of the present invention, the neural network classifier model may be exchanged by prediction model that include decision trees, Support Vector Machines (SVMs), random forest methods, and so forth.

Figure 4:
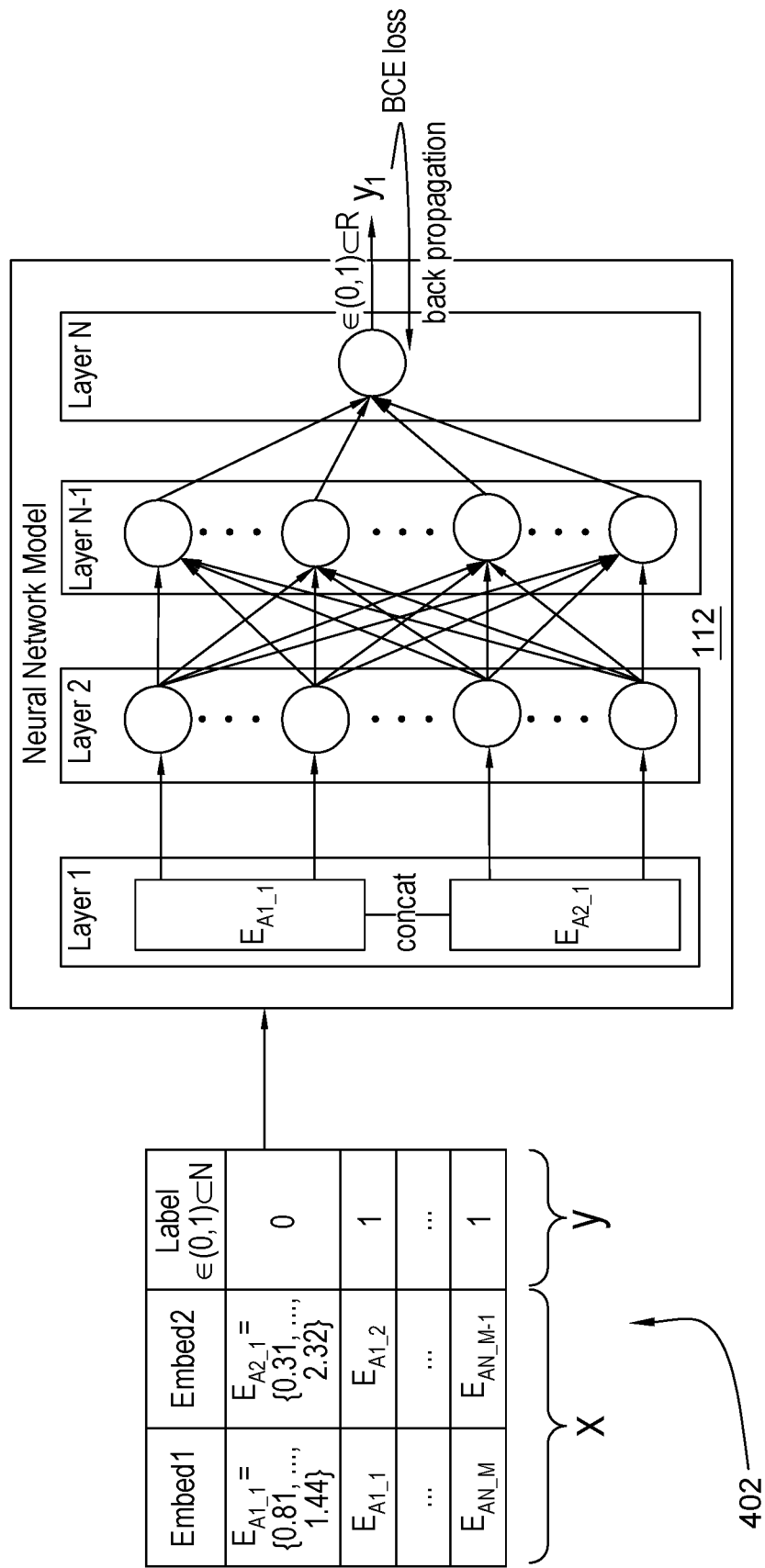
FIG. 4 is a schematic representation of aspects of the comparison module of the system shown in FIG. 1.

According to aspects of the invention, the server computer 102, in order to train the neural network classifier (as shown schematically in FIG. 4), generates a balanced dataset 402 containing randomly paired intra-cluster and inter-cluster embedding pairs X stored with known binary labels y (i.e., 1=intra-cluster, 0=inter-cluster pair). The server computer 102 passes this training dataset 402 to a neural network model in the comparison module 112 to generate a classifier trained to distinguish if the elements in an embedding pair (e.g., two randomly-selected embeddings) are from the same cluster or if the two compared are from different clusters. It is noted that a neural network is a preferred classifier model, especially since these models excel in online learning, continuing to learn after training from the clusters generated at inference time. However, other prediction models selected by one skilled in this field could also suffice. For example, according to aspects of the present invention, the neural network classifier model may be exchanged by prediction model that include decision trees, Support Vector Machines (SVMs), random forest methods, and so forth.

Figures 5A, 5B:
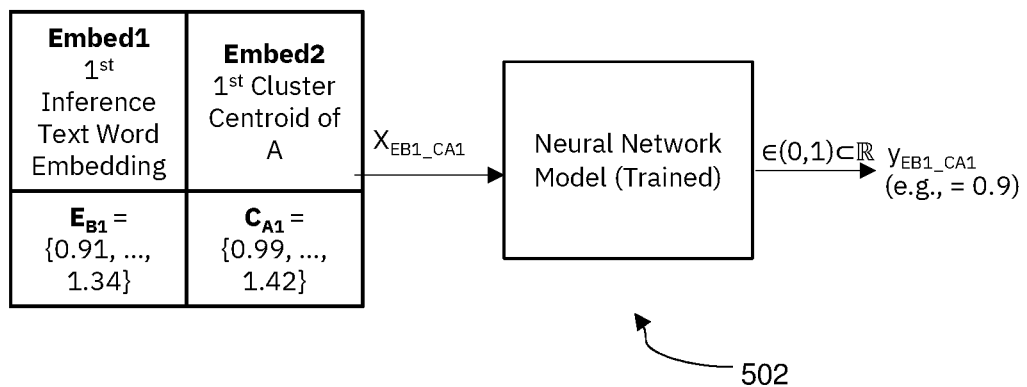
FIG. 5A is a schematic representation of aspects of the comparison module of the system shown in FIG. 1 shown in use.
FIG. 5B is an overview of decision criteria considered by the comparison module of the system shown in FIG. 1 during use.

The server computer 102, via an inference portion 502 of the comparison module 108 (as shown schematically in FIG. 5A and FIG. 5B), generates for each comparison document word embedding $e_B$, topic correspondence values relative to the representative embeddings $c_A$ of the first set of clusters a1,a2. In particular, the server computer 102, via comparison module 114 predicts the correspondence value $\in (0,1) \subset \mathbb{R}$ between each representative embedding $c_A$ and each contextual word embedding $e_B$ of B using the trained neural network classifier. According to aspects of the invention, the server computer, via the classifier (or other comparison method), assigns each embedding of the comparison 108 texts to a cluster of the reference text 106. The comparison module 114 pairs each comparison text embedding with each representative embedding of the reference text clusters and passes these pairs through the classifier. For each comparison text embedding, the pair with the best score indicates the cluster to which the embedding is assigned. The server computer generates clusters from the contextual word embedding of B by assigning each of them to a best matching cluster center $c_A$.

Figure 7C:
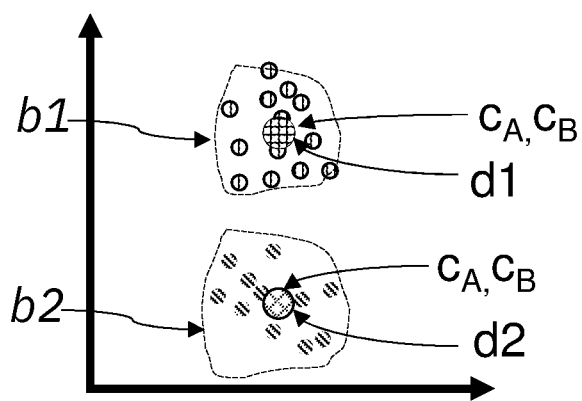
FIG. 7C is a schematic representation of aspects the embedding clusters shown in FIG. 7A and FIG. 7B being compared according to aspects of the present invention and showing a perfect match.
Figure 8C:
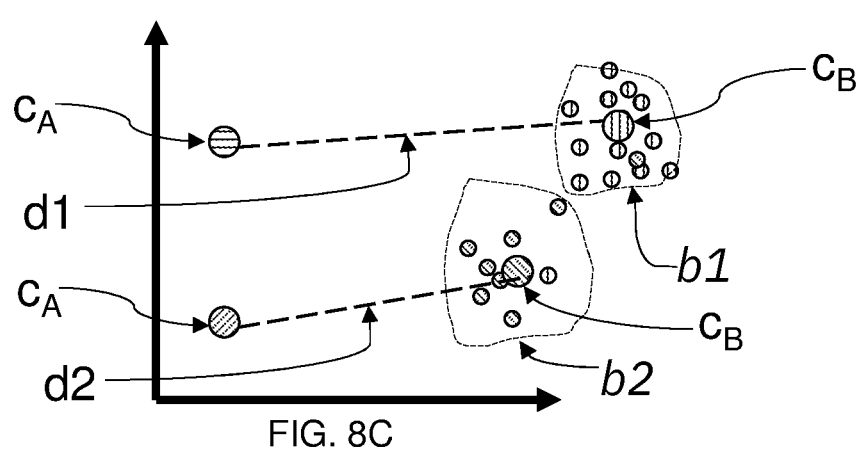
FIG. 8C is a schematic representation of aspects the embedding clusters shown in FIG. 8A and FIG. 8B being compared according to aspects of the present invention and showing an unacceptable match.

The server computer 102 via continued use of the comparison module 114 at block 208 generates a second set of clusters b1,b2 (e.g., as shown schematically in FIG. 6C, FIG. 7C, and FIG. 8C), by assigning each comparison document word embedding to a best matching one of the first set of clusters, based on topic correspondence values d1,d2. According to aspects of the invention, the server computer generates clusters from the contextual word embedding of B by assigning each of them to their best matching cluster center $c_A$ For each centroid embedding of reference text clusters (e.g., a1, . . . , an), the server computer 102 passes pairs of comparison document embeddings and centroid embeddings into the neural network, and the output is a correspondence value between 0 and 1. According to aspects of the invention, the comparison module 114 assigns embeddings to the cluster for which it has the highest correspondence value d1,d2. As noted in an exemplary explanation 504 in FIG. 5B, cluster $C_{A1}$ is selected for embedding $E_{B1}$ if $y_{EB1\_CA1}$ is greater than all other predicted y between embedding $E_{B1}$ and representative embeddings $C_A$. It is noted that while it preferred to use a cluster centroid as a representative embedding, other representative embeddings (e.g. an existing embedding chosen by one skilled in this field to represent a notable aspect of the associated cluster, etc.) may also be used.

Figure 6C:
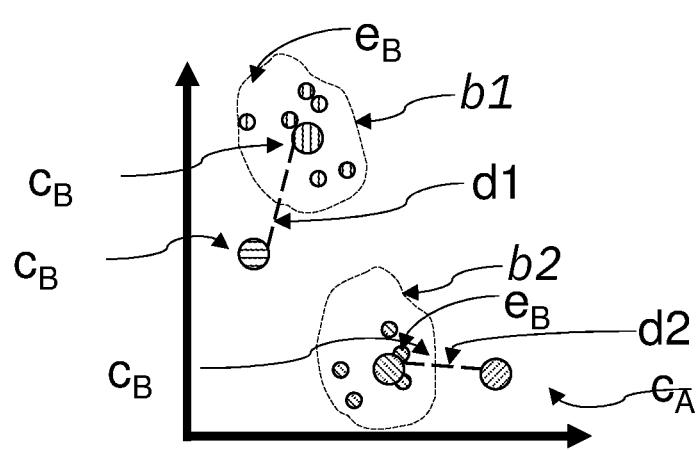
FIG. 6C is a schematic representation of aspects the embedding clusters shown in FIG. 6A and FIG. 6B being compared according to aspects of the present invention and showing an acceptable match.

Now with reference to FIG. 6C, an acceptable correspondence value will be discussed. The server computer computes centroid correspondence values d(a1:b1, a2:b2) using the neural network, resulting in exemplary values nn(a1, b1)= 0.8 and nn(a2,b2)=0.9. These are considered acceptable correspondence values, and embeddings from the comparison document 108 have meaningful semantic associations with topics in the relevant source document 106. Now with reference to FIG. 7C, an acceptable correspondence value will be discussed. The server computer computes centroid correspondence values d(a1:b1, a2:b2) using the neural network, resulting in exemplary values nn(a1,b1)=1.0 and nn(a2,b2)=1.0. These are considered perfect correspondence values, and embeddings from the comparison document 108 have meaningful semantic associations (e.g., apparently identical) with topics in the relevant source document 106. Now with reference to FIG. 8C, an acceptable correspondence value will be discussed. The server computer computes centroid correspondence values d(a1:b1, a2:b2) using the neural network, resulting in exemplary values nn(a1,b1)=0.2 and nn(a2,b2)=0.14. These are considered unacceptable correspondence values, and embeddings from the comparison document 108 do not have meaningful associations (e.g., substantially-identical) semantic associations with topics in the relevant source document 106.

The server computer 102, at block 210, determines a representative embedding $C_B$ for each of the second set of clusters b1,b2. It is noted that representative embeddings $C_B$ can be computed (e.g., as the mean, median, or other value selected to provide a representative embedding) from embeddings in the corresponding cluster (i.e., $c_{b1}$ and $c_{b2}$ for b1 and b2, respectively).

Figures 11A, 11B:
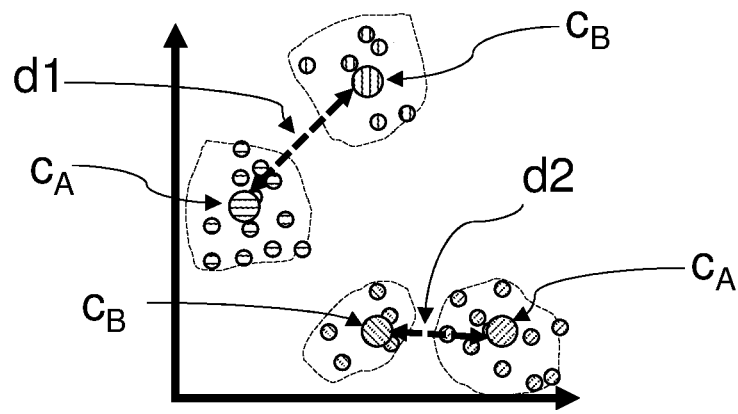
FIG. 11A is a schematic representation of aspects the embedding clusters shown in FIG. 9A and FIG. 9B shown together for comparison according to aspects of the present invention.
FIG. 11B is an overview of representative attributes of the clusters shown in FIG. 11A according to aspects of the present invention.

The server computer 102 at block 212, uses the neural network model, to determine for each centroid of the second set of clusters compared to each centroid of the first set of clusters, a cluster similarity value (e.g., a representative example of which shown graphically in FIG. 11A and discussed in explanation 1102 shown in FIG. 11B). In particular, the comparison module 114 predicts the correspondence value $d_{BA}$ between cluster representative embeddings (e.g., between representative embedding $c_B$ and representative embedding $c_A$), using the trained neural network classifier. It is noted that although use of the trained neural network classifier is a preferred method of comparison, other comparison methods may also be used. For example, while not as accurate as comparisons generated by the trained neural network classifier, comparisons based on vector distance and similarity measures (e.g., methods that compare cosine distance, angular distance, Euclidean distance, Manhattan distance, and so forth), as selected by one skilled in this field, would also suffice.

Figures 9A, 9B:
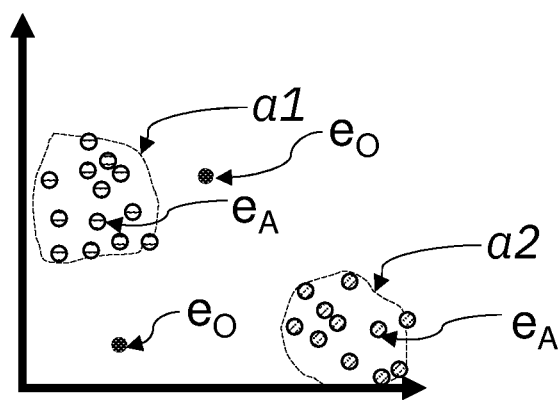
FIG. 9A is a schematic representation of aspects the embedding clusters of a reference document according to aspects of the present invention.
FIG. 9B is an overview of attributes of the clusters shown in FIG. 9A according to aspects of the present invention.
Figures 10A, 10B:
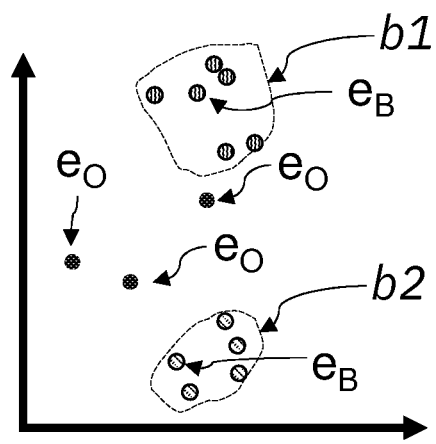
FIG. 10A is a schematic representation of aspects the embedding clusters of a comparison document according to aspects of the present invention.
FIG. 10B is an overview of attributes of the clusters shown in FIG. 10A according to aspects of the present invention.

The server computer 102, at block 214, modifies the similarity value by multiplying the cluster similarity values by a modification value. According to aspects of the invention, the modification value is a cluster weight value based on a number of embeddings (e.g., as shown in FIGS. 9A & 10A and discussed in explanations 902, 1002 shown in FIGS. 9B & 10B). According to aspects of the invention, the modification value is a cluster relative importance weight proportion (e.g., a ratio of cluster weights shown in FIG. 9A and FIG. 10A and in showing relative importance of clusters in a given pair of compared documents). According to aspects of the invention, relative weight proportion $p_{BA}$ for the $c_B c_A$ pairs that determine how much of content (e.g., as represented by a relative number of embeddings) B assigns to its cluster $c_B$ as compared to A to its cluster $c_A$. Aspects of the invention recognize that when a cluster $c_A$ is heavily represented (e.g., by a high number of words) in A in relation to other clusters of A, then the well-matched corresponding cluster $c_B$ of B would also receive a well-matched amount of attention (measured by relative number of words) in B. According to aspects of the invention, a preferred relationship for relative weight proportion is $p_{BA}$=Min($w_A$, $w_B$)/Max ($w_A$, $w_B$), whereby the weights $w_A$, $w_B$ correspond to a "closest" $c_B$ $c_A$ pair. It is noted that, as shown in FIGS. 9A and 10A some outlying embeddings $e_o$ may be excluded from clusters. This aspect of the invention allows flexible topic selection and evaluation. In an embodiment, the server computer 102 may particularly identify outlying embeddings $e_o$ in a user display (e.g., a user interface showing an associated t-SNE graph, represented text, or other indicia selected by one skilled in this field).

It is noted that, as particularly shown in FIG. 10, it is possible to adjustably penalize the document similarity result. For example, by excluding outlying embeddings $e_o$, the comparison text B would likely be evaluated with more similarity than actually exists, and the evaluation will not be as accurate, as some data points (e.g., 3 outlying embeddings $e_o$) are missing. According to aspects of the invention, this arrangement would allow a user to search for a suitable text representation (e.g. say a stock exchange article), while excluding a specific sub-topic in the summary (e.g. specific stocks) from consideration.

According to aspects of the invention, cluster weights $w_A$ of $c_A$ and $w_B$ of $c_B$ are the ratio of the number of embeddings in the respective cluster $c_A$ (or $c_B$) compared to the total number of clustered embeddings of A (or B). Aspects of the invention recognize that topics (e.g. as represented by semantic clusters) with importance within a document should be given a stronger weight when determining similarity scores. Exemplary cluster weights, relative weight proportions, summary scores, and weighted summary scores are shown combined according to aspects of the present invention in explanation 1202 of FIG. 12 to provide an exemplary comparison document similarity value $S_{BA}$. In the example shown 1202, shown in FIG. 1202, the $S_{BA}$ is 0.84 which exceeds an exemplary sufficiency threshold of 0.6. It is noted that the sufficiency threshold can be adjusted in accordance with the judgement of one skilled in this field.

The server computer 102, at block 216, determines by said computer for each comparison document, a sufficiency rating based, at least in part, on at least one of the cluster similarity values. In an embodiment, the sufficiency rating is based on a sum of the cluster similarity values.

The server computer 102, at block 218, responsive to the sufficiency rating exceeding a sufficiency threshold, determining the comparison document is a sufficient representation (e.g., a summary) of the reference document.

The server computer 102, at block 220, generates document similarity values for a plurality of comparison documents. The server computer 102 uses the document similarity values to generate a ranked list of comparison documents that is ordered, at least in part, by those document similarity values.

Now with reference to FIG. 13, aspects of an alternate method for assessing the similarity of one or more comparison documents to one or more reference documents will be described. Step numbers 1-17 identify action steps described below and are used in FIG. 13 to schematically indicate the steps associated with various components. It is noted that some components are used in more than one of the steps 1-17 being described.

Figure 13:
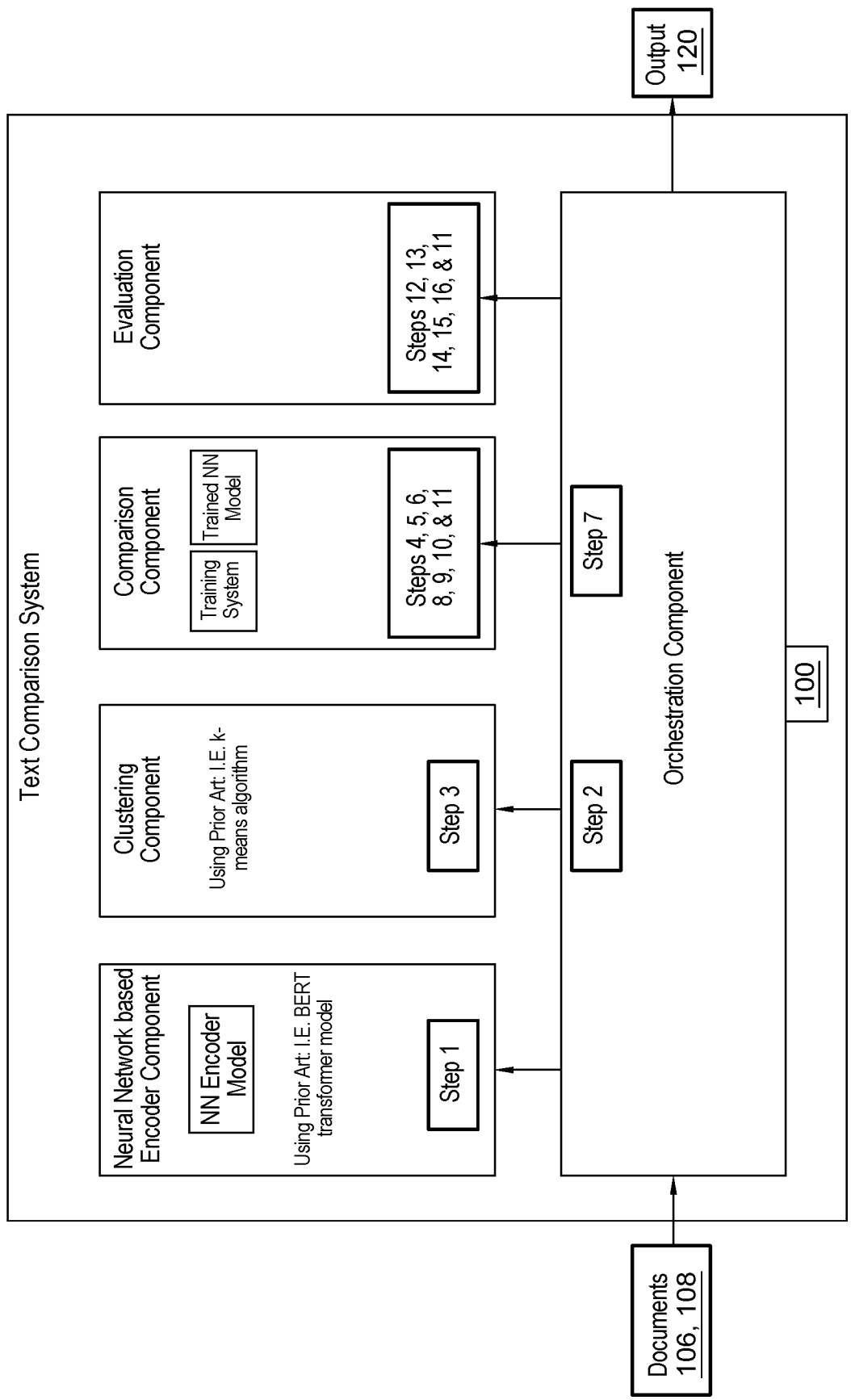
FIG. 13 is a schematic representation of aspects of the system shown in FIG. 1 attributed to aspects of an alternate logic flow.

With continued reference to FIG. 13, the server computer 102 receives, at step 1, input (e.g., one or more reference and comparison documents 106, 108) via an orchestration component (e.g., Assessment Coordination Module (ACM) 118) and generates via encoder module 110 contextual word embeddings for (masked) words in reference text A (or a plurality of texts A) via sliding windows. It is noted that although it is preferred to use a sliding window methodology, other methods (e.g., pass the entire text or parts of the text passages through the neural network encoder) as selected by one of skill in this field could also suffice. The server computer 102, via orchestration component (e.g., Assessment Coordination Module (ACM) 118), removes, at step 2, the embeddings that correspond to stop words. The server computer 102 via clustering module 112 generates, at step 3, semantic topics by clustering the remaining contextual word embeddings. The server computer 102 via the comparison module 114 computes, at step 4, cluster centers $c_A$ for each cluster i.e., such a representative embedding can be computed (e.g., the mean, median, or other value selected to provide a representative embedding) from embeddings in the corresponding cluster (i.e., $c_{a1}$ and $c_{a2}$ for a1 and a2, respectively). The server computer 102 via the comparison module 114 generates, at step 5, a balanced dataset containing randomly paired intra-cluster and inter-cluster embedding pairs X stored with binary labels y (1=intra-cluster, 0=inter-cluster pair). The server computer 102 via the comparison module 114 trains or fine-tunes, at step 6, a neural network classifier that predicts if an embedding pair is from the same cluster or if the two embeddings are from different clusters. It is noted that the dataset generation and training of the classifier can be done completed offline and prior to inference. The server computer 102 via the orchestration component (e.g., Assessment Coordination Module (ACM) 118) generates, at step 7, embeddings and, in some embodiments, stop word removal for comparison document text B (or a plurality of texts B). The server computer 102 via the comparison module 114 predicts, at step 8, the correspondence $\in(0,1) \subset \mathbb{R}$ between each cluster representative embedding (e.g., cluster center $c_A$) and each contextual word embedding of B using the trained neural network classifier. The server computer 102 via the comparison module 114 generates, at step 9, clusters from the contextual word embedding of B by assigning each of them to their best matching cluster represented by $c_A$. The server computer 102 via the comparison module 114 computes, at step 10, cluster represented by $c_B$ for each cluster of B. The server computer 102 via the comparison module 114 predicts, at step 11, the correspondence $d_{BA}$ between each cluster center $c_B$ and its corresponding cluster center $c_A$ using the trained neural network classifier. The server computer 102 via the evaluation module 116 computes, at step 12, weights $w_A$ of $c_A$ and $w_B$ of $c_B$ based on their relative number of embeddings. The server computer 102 via the evaluation module 116 computes, at step 13, relative weight proportion $p_{BA}(w_A, w_B)$ for $c_A c_B$ cluster pairs. The server computer 102 via the evaluation module 116 computes, at step 14, cluster scores $s_{BA}$ by multiplying corresponding $d_{BA}$, $w_A$ and $p_{BA}(w_A, w_B)$. The server computer 102 via the evaluation module 116 for each text of B, calculates, at step 15, a text comparison score $S_{BA} \in (0,1) \subset \mathbb{R}$ i.e. as sum of all $s_{BA}$ cluster scores of that text. The server computer 102 via the evaluation module 116 selects, at step 16, each text of B with a score $S_{BA}$ above a pre-defined confidence threshold T. The server computer 102, at step 17, via the evaluation module 116 ranks and returns the selected texts of B.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
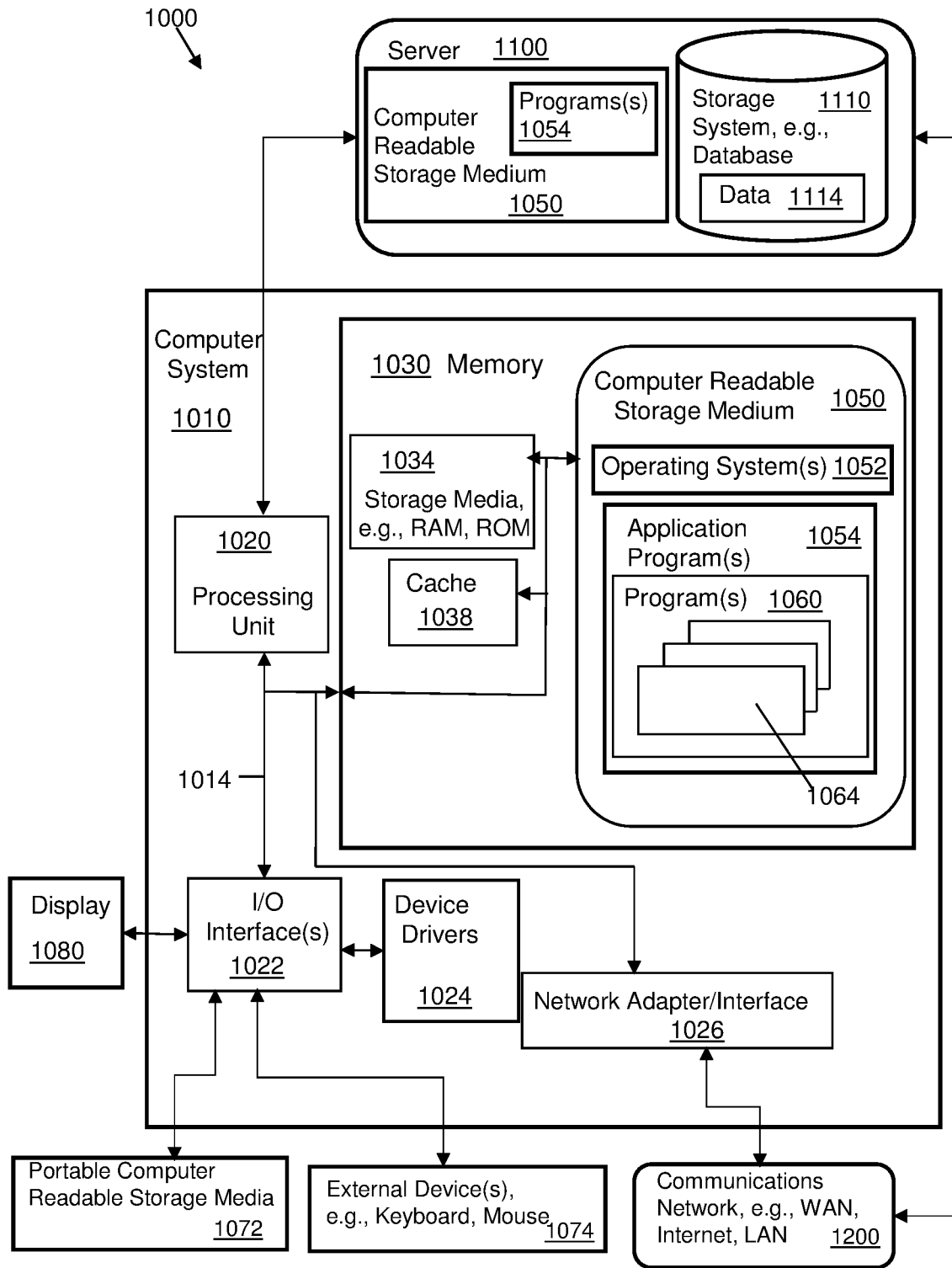
FIG. 14 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 14, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, modules, logic, data structures, and so on that perform particular tasks or implement particular abstract data types. The method steps and system modules and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/

Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other modules of the computer 1010 via bus 1014. It should be understood that although not shown, other hardware and/or software modules could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking modules (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
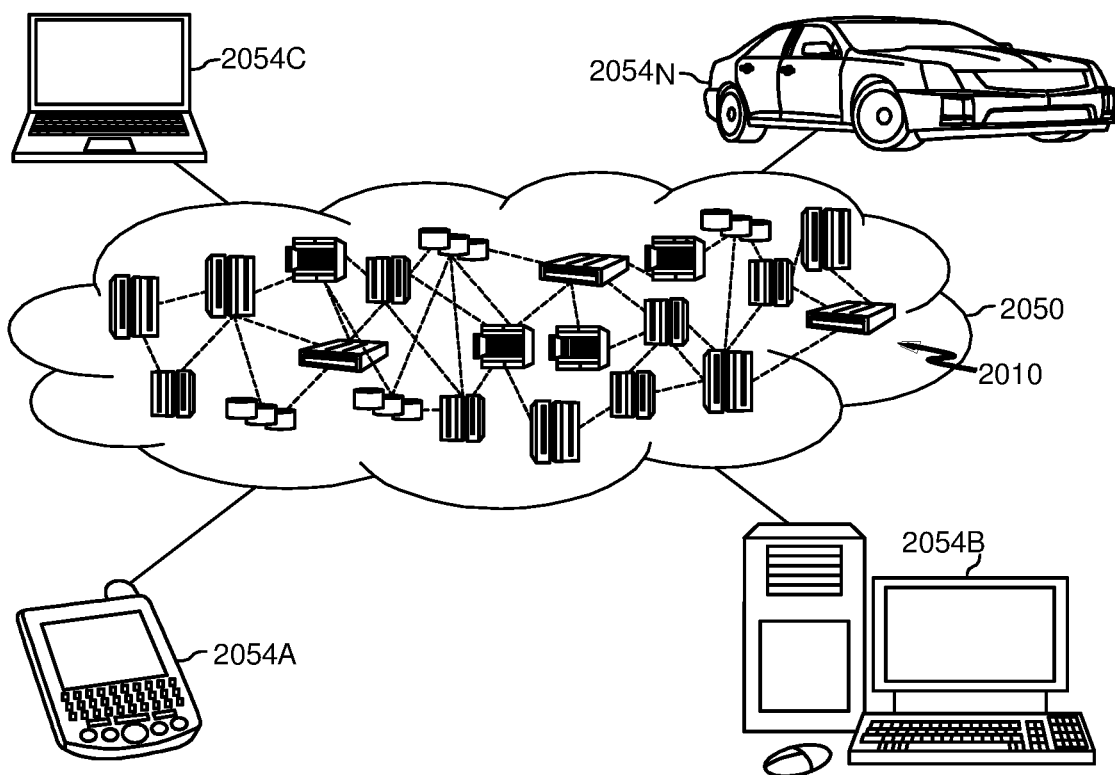
FIG. 15 depicts a cloud computing environment according to an embodiment of the present invention.

Referring now to FIG. 15, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 16:
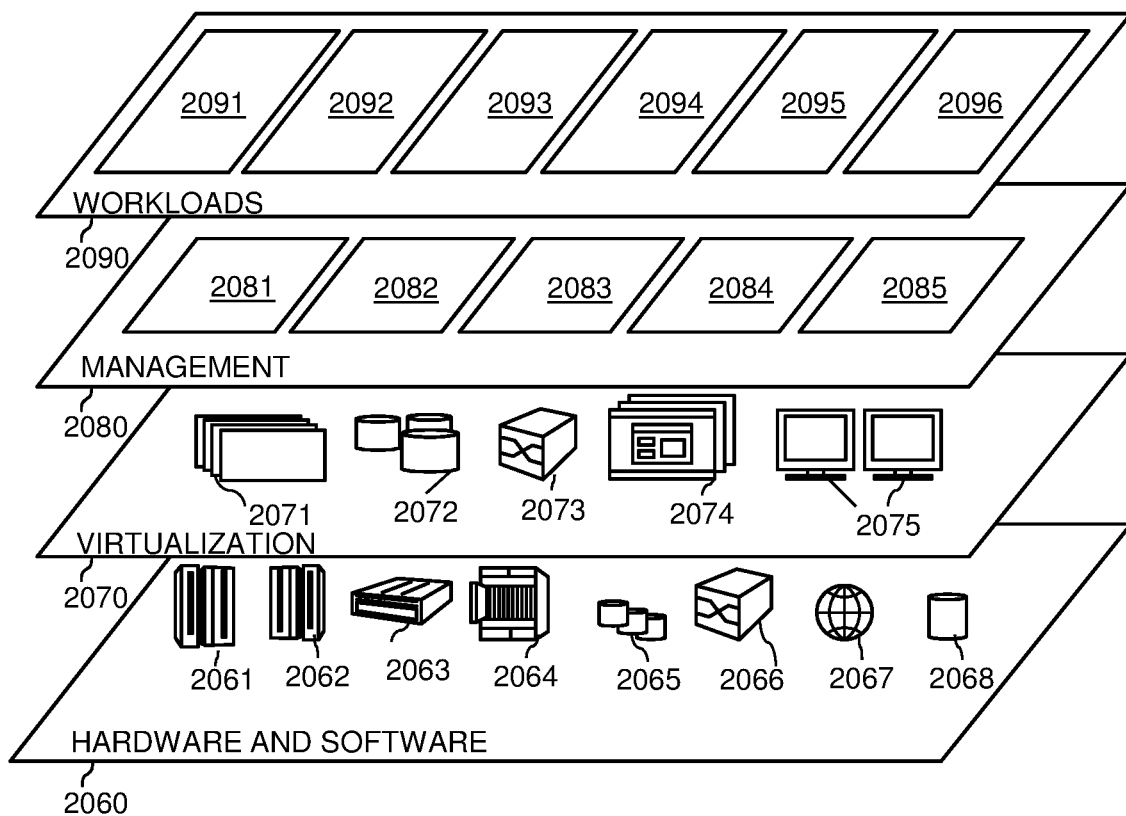
FIG. 16 depicts abstraction model layers according to an embodiment of the present invention.

Referring now to FIG. 16, a set of functional abstraction layers provided by cloud computing environment 2050 (FIG. 15) is shown. It should be understood in advance that the modules, layers, and functions shown in FIG. 16 are intended to be illustrative only and embodiments of the invention are not limited thereto. As depicted, the following layers and corresponding functions are provided:

Hardware and software layer 2060 includes hardware and software modules. Examples of hardware modules include: mainframes 2061; RISC (Reduced Instruction Set Computer) architecture based servers 2062; servers 2063; blade servers 2064; storage devices 2065; and networks and networking modules 2066. In some embodiments, software modules include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and assessing the similarity of one or more comparison documents to one or more reference documents using contextual embeddings derived from the documents and clusters associated with topics present in the reference documents 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to assign a similarity value to a comparison document, comprising:
    receiving by said computer, for a reference document, contextual word embeddings arranged into a first set of clusters, each representing a topic and characterized by a representative embedding;
    receiving by said computer, for at least one comparison document, a set of contextual word embeddings;
    determining, by said computer, using a neural network model classifier trained to predict whether embeddings are in a same cluster, for each comparison document contextual word embedding, topic correspondence values relative to the representative embeddings of said first set of clusters;
    generating, by said computer, a second set of clusters by assigning each comparison document contextual word embedding to a best matching one of the first set of clusters, according to the topic correspondence values;
    determining by said computer, a representative embedding for each of the second set of clusters;
    using, by said computer, a comparison method, to determine for each centroid of the second set of clusters compared to each centroid of the first set of clusters, a cluster similarity value; and
    determining, by said computer for each comparison document, a document similarity value based, at least in part, on at least one of the cluster similarity values.

2. The method of claim 1, wherein said document similarity value rating is further based upon multiplying said cluster similarity values by at least one modification value selected from a group consisting of an associated cluster weight value, and a cluster relative weight proportion.

3. The method of claim 1, wherein:
a set of training data for said neural network includes pairs of intra-cluster and inter-cluster embeddings from a set of clusters respectively, wherein each pair is labeled as intra-cluster or inter-cluster; and
wherein said neural network generates a classifier based on said training data.

4. The method of claim 1, wherein said received contextual word embeddings are generated by passing text from the reference document through a deep neural network.

5. The method of claim 1, wherein said clusters are established by applying a clustering algorithm to said embeddings.

6. The method of claim 1, wherein said representative embeddings are based, at least in part, on a computed embedding value selected from a group consisting of mean embedding, medoid embedding, and concatenated embedding of a plurality of embeddings in said cluster.

7. The method of claim 1, wherein, responsive to a sufficiency rating exceeding a sufficiency threshold, determining the comparison document to be an acceptable representation of the reference document.

8. The method of claim 1, wherein said at least one comparison document is a plurality of comparison documents; wherein said computer generates a cluster similarity value for each of said plurality of comparison documents; and wherein said computer generates a ranked list of said plurality of comparison documents ordered, at least in part by document similarity value.

9. A system to assign a similarity value to a comparison document, which comprises:
a computer system comprising a computer readable storage medium having program instructions embodied therewith, the program instructions executable by a computer to cause the computer to:
receive for a reference document, contextual word embeddings arranged into a first set of clusters, each representing a topic and characterized by a representative embedding;
receive for at least one comparison document, a set of contextual word embeddings;
determine using a neural network model classifier trained to predict whether embeddings are in a same cluster, for each comparison document contextual word embedding, topic correspondence values relative to the representative embeddings of said first set of clusters;
generate a second set of clusters by assigning each comparison document contextual word embedding to a best matching one of the first set of clusters, according to the topic correspondence values;
determine a representative embedding for each of the second set of clusters;
use a comparison method, to determine for each centroid of the second set of clusters compared to each centroid of the first set of clusters, a cluster similarity value; and
determine for each comparison document, a document similarity value based, at least in part, on at least one of the cluster similarity values.

10. The system of claim 9, wherein said document similarity value rating is further based upon multiplying said cluster similarity values by at least one modification value selected from a group consisting of an associated cluster weight value, and a cluster relative weight proportion.

11. The system of claim 9, wherein:
a set of training data for said neural network includes pairs of intra-cluster and inter-cluster embeddings from a set of the clusters respectively, wherein each pair is labeled as intra-cluster or inter-cluster; and
wherein said neural network generates a classifier based on said training data.

12. The system of claim 9, wherein said received contextual word embeddings are generated by passing text from the reference document through a deep neural network.

13. The system of claim 9, wherein said representative embeddings are based, at least in part, on a computed embedding value selected from a group consisting of mean embedding, medoid embedding, and concatenated embedding of a plurality of embeddings in said cluster.

14. The system of claim 9, wherein, the instructions responsive to a sufficiency rating exceeding a sufficiency threshold, further cause the computer to determine the comparison document to be an acceptable representation of the reference document.

15. A computer program product to assign a similarity value to a comparison document, the computer program product comprising a computer readable storage medium having program instructions embodied therewith, the program instructions executable by a computer to cause the computer to:
receive, using the computer, for a reference document, contextual word embeddings arranged into a first set of clusters, each representing a topic and characterized by a representative embedding;
receive, using the computer, for at least one comparison document, a set of contextual word embeddings;
determine, using the computer, using a neural network model classifier trained to predict whether embeddings are in a same cluster, for each comparison document contextual word embedding, topic correspondence values relative to the representative embeddings of said first set of clusters;
generate, using the computer, a second set of clusters by assigning each comparison document contextual word embedding to a best matching one of the first set of clusters, according to the topic correspondence values;
determine, using the computer, a representative embedding for each of the second set of clusters;
use a comparison method to determine for each centroid of the second set of clusters compared to each centroid of the first set of clusters, a cluster similarity value; and
determine, using the computer, for each comparison document, a document similarity value based, at least in part, on at least one of the cluster similarity values.

16. The computer program product of claim 15, wherein said document similarity value rating is further based upon multiplying said cluster similarity values by at least one modification value selected from a group consisting of an associated cluster weight value, and a cluster relative weight proportion.

17. The computer program product of claim 15, wherein a set of training data for said neural network includes pairs of intra-cluster and inter-cluster embeddings from a set of the clusters respectively, wherein each pair is labeled as intra-cluster or inter-cluster; and
wherein said neural network generates a classifier based on said training data.

18. The computer program product of claim 15, wherein said received contextual word embeddings are generated by passing text from the reference document through a deep neural network.

19. The computer program product of claim 15, wherein said representative embeddings are based, at least in part, on a computed embedding value selected from a group consisting of mean embedding, medoid embedding, and concatenated embedding of a plurality of embeddings in said cluster.

20. The computer program product of claim 15, wherein the instructions responsive to a sufficiency rating exceeding a sufficiency threshold, further cause the computer to determine the comparison document to be an acceptable representation of the reference document.

\* \* \* \* \*